(12) United States Patent
Wiradarma et al.

(10) Patent No.: US 8,578,336 B1
(45) Date of Patent: Nov. 5, 2013

(54) SYSTEMS AND METHODS FOR PROVIDING A TEST AUTOMATION FRAMEWORK HAVING A UNIFIED USER INTERFACE

(75) Inventors: Andre Wiradarma, San Antonio, TX (US); Nolberto Farias, Jr., San Antonio, TX (US); John Ensminger, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1146 days.

(21) Appl. No.: 12/263,926

(22) Filed: Nov. 3, 2008

(51) Int. Cl.
*G06F 9/44* (2006.01)
(52) U.S. Cl.
USPC ............................ 717/125; 717/127; 717/128
(58) Field of Classification Search
USPC .................... 717/124–131, 140–143; 715/700
See application file for complete search history.

(56) References Cited

U.S. PATENT DOCUMENTS

| | | | |
|---|---|---|---|
| 5,487,169 A * | 1/1996 | Vraney et al. ................. | 717/142 |
| 6,341,361 B1 | 1/2002 | Basto et al. | |
| 6,397,379 B1 * | 5/2002 | Yates et al. ..................... | 717/140 |
| 6,721,941 B1 * | 4/2004 | Morshed et al. .............. | 717/127 |
| 6,728,949 B1 * | 4/2004 | Bryant et al. .................. | 717/127 |
| 7,089,542 B2 * | 8/2006 | Brand et al. ................... | 717/143 |
| 7,100,152 B1 * | 8/2006 | Birum et al. ................... | 717/131 |
| 7,290,249 B2 * | 10/2007 | Sengodan ...................... | 717/136 |
| 7,293,262 B2 * | 11/2007 | Sengodan ...................... | 717/136 |
| 7,337,431 B1 * | 2/2008 | Barnes et al. .................. | 717/124 |
| 7,490,319 B2 * | 2/2009 | Blackwell et al. ............ | 717/124 |
| 7,516,446 B2 * | 4/2009 | Choi et al. ..................... | 717/128 |
| 7,707,557 B1 * | 4/2010 | Nikolov ......................... | 717/130 |
| 7,886,271 B2 * | 2/2011 | Agarwala et al. ............. | 717/124 |
| 7,890,931 B2 * | 2/2011 | Lauzon et al. ................. | 717/125 |
| 7,950,003 B1 * | 5/2011 | Duca et al. ..................... | 717/124 |
| 8,001,529 B2 * | 8/2011 | Babut et al. .................... | 717/124 |
| 8,060,864 B1 * | 11/2011 | Michelsen ...................... | 717/126 |
| 8,079,019 B2 * | 12/2011 | Lindo et al. .................... | 717/129 |
| 8,171,457 B2 * | 5/2012 | Dimpsey et al. ............... | 717/125 |
| 2004/0095386 A1 | 5/2004 | Flynn et al. | |
| 2007/0022407 A1 | 1/2007 | Givoni et al. | |
| 2008/0010537 A1 | 1/2008 | Hayutin et al. | |

OTHER PUBLICATIONS

Phang et al, "EXPOSITOR: scriptable time travel debugging with first class traces", IEEE, pp. 352-361, 2013.*
Kulesza et al, Why oriented end user debugging of naïve bayes text classification, ACM Trans. on Interactive Intelligent Sys. vol. 1. No. 1, article 2, pp. 1-31, 2011.*

(Continued)

*Primary Examiner* — Anil Khatri
(74) *Attorney, Agent, or Firm* — Brooks, Cameron & Huebsch, PLLC

(57) ABSTRACT

A user interface for designing tests to be run against a piece of software. The user interface provides an environment in which test specifications including scenarios, business flow modules, flow lists, and steps and actions may be presented, created and modified. The user interface may be dynamically updated with data from a repository to update the presented information. Changes to code associated with the scenarios, business flow modules, flow lists, and steps and actions may be dynamically communicated back to a repository to update the code without a need to repackage an application associated with the code. The test specifications may be specified in a generic format, such as an eXtensible Markup Language (XML) format that meets a schema.

12 Claims, 15 Drawing Sheets

(56) References Cited

OTHER PUBLICATIONS

Hao et al, "Fast dynamic multiple set membership tetsing using combinational bloom filters", IEEE, vol. 29, No. 1, pp. 295-304, 2012.*

Sack et al, "Accurate and efficient filtering for the intel thread checker race detector", ACM, pp. 34-41, 2006.*

ALSMADi, Izzat, et al. "Building a user interface test automation framework", Department of Computer Science, North Dakota State University, Sep. 2007, 6 pgs.

* cited by examiner

US 8,578,336 B1

SYSTEMS AND METHODS FOR PROVIDING A TEST AUTOMATION FRAMEWORK HAVING A UNIFIED USER INTERFACE

BACKGROUND

Testing is a normal part of the software development process. Software under development is commonly tested by providing various types of input to the software and observing the software's behavior. A person may provide the input. For example, in an interactive application, such as a web application, a person could test the application by manually providing various types of input to the software through a browser. However, in many cases, the process of providing input is automated.

Developing automated test specifications and scenarios can be a cumbersome task because of the tools used to create the test specifications and the knowledge requirements. As such, developers often create the test specifications as they may have detailed knowledge about how the code works, and thus may be able to devise appropriate tests for the code. This makes it difficult for non-developers or less-technically inclined individuals to develop tests without assistance of developers. In addition, the tools that are designed for non-developers are limited.

SUMMARY

A user interface for designing tests for a piece of software that provides an environment in which test specifications including scenarios, business flow modules, flow lists, and steps and actions may be presented, created and modified. The user interface may be dynamically updated with data from a repository to update the presented information. Changes to code associated with the scenarios, business flow modules, flow lists, and steps and actions may be dynamically communicated back to a repository to update the code without a need to repackage an application associated with the code.

Tests may be created for a software component within the user interface. A test may be stored as a specification of how to interact with software that uses the component. The specification may be, for example, stored in an eXtensible Markup Language (XML) form, in accordance with some XML schema. Using XML to specify the test allows the specification of the test to be independent of the particular test engine that would be used to perform the test. In addition, the use XML provides for a mechanism to dynamically update the user interface with changes to the data representing the test specifications.

This summary is provided to introduce a selection of concepts in a simplified form that are further described in the detailed description section. This summary is not intended to identify key features or essential features of the claimed subject matter, nor is it intended to be used to limit the scope of the claimed subject matter.

DETAILED DESCRIPTION

Commercial software is normally tested before full-scale deployment. Testing is normally performed by testers' interacting with the software. Some tests may be designed to verify that routine functions of the software are working, and some tests are designed to break the software in order to evaluate the software's robustness in situations where the software might be used in a manner outside the expected norms (e.g., through malevolence, or accidental misuse). The tester may interact with the software manually, or using a test engine. A test engine interacts with the software using a script that drives the interaction. In many cases, the script emulates a human's interaction with the software, although a script could emulate any type of interaction.

Figure 1:
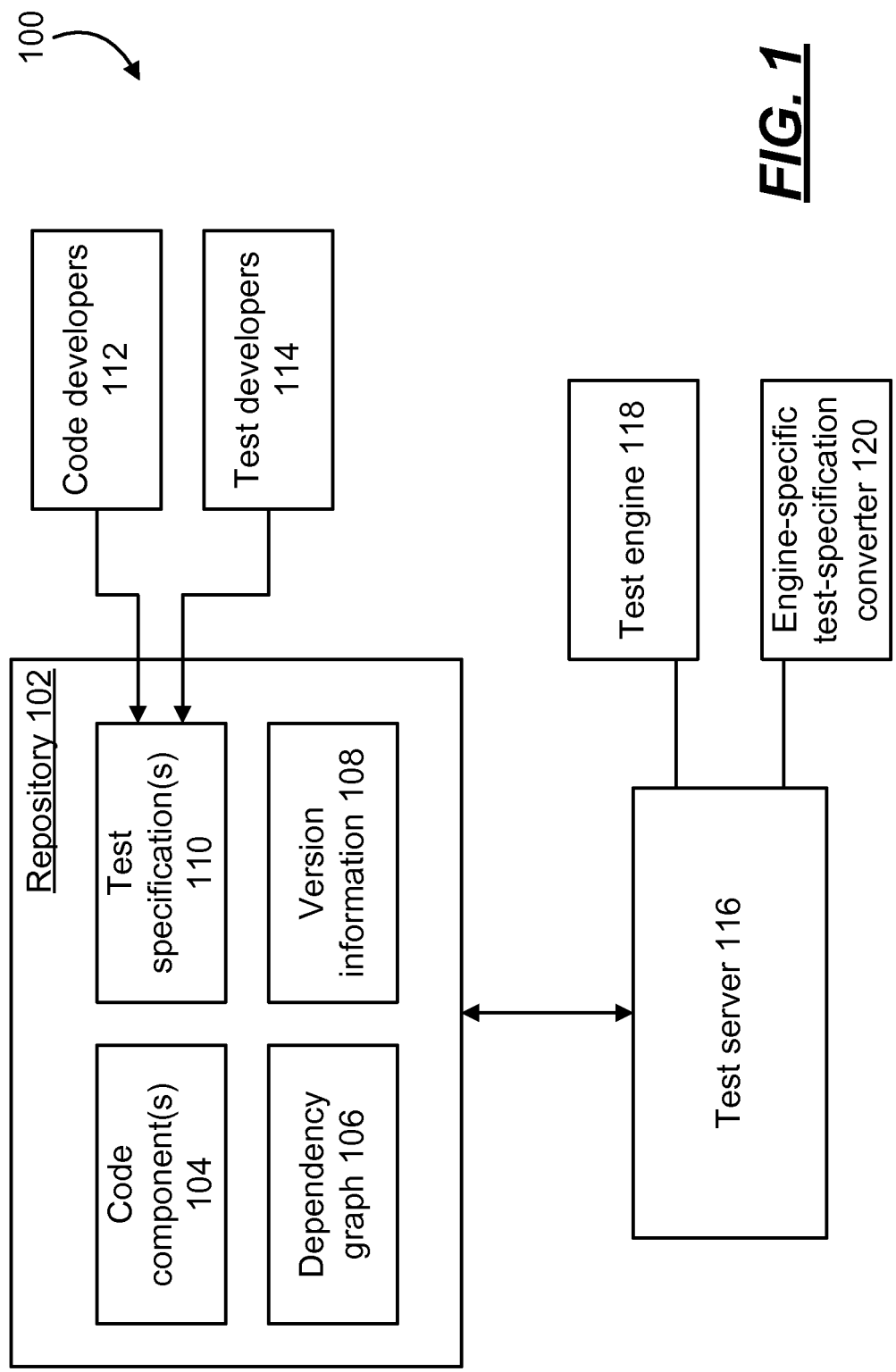
FIG. 1 is a block diagram of an example scenario in which tests for software may be developed and/or used.
Figure 2:
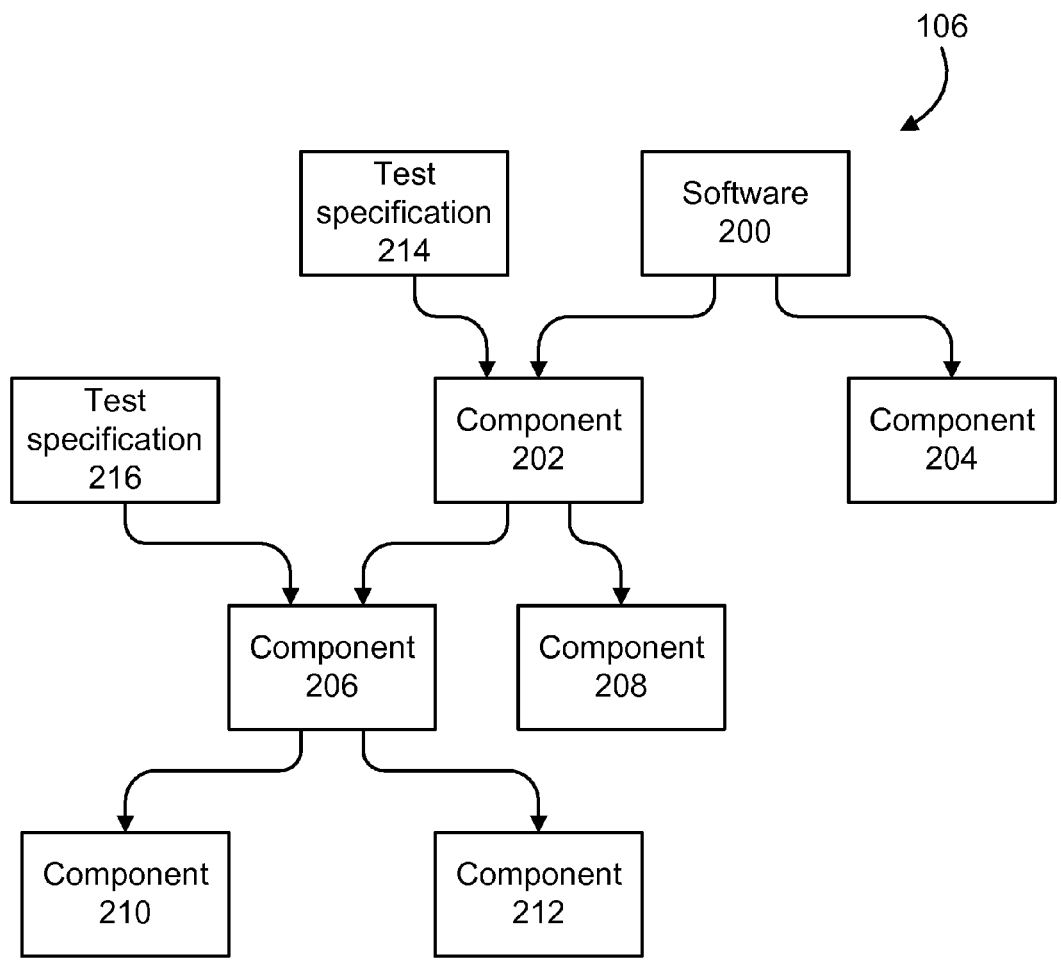
FIG. 2 is a block diagram of an example dependency graph.

Turning now to the drawings, FIG. 1 shows an example scenario 100 in which tests for software may be developed and/or used. Repository 102 stores software assets. Code component(s) 104 are examples of software assets that may be stored in repository 102. Repository 102 also may store metadata, such as dependency graph 106 and versioning information 108. Dependency graph 106 may define relationships between different code components. For example, if a banking web application makes use of a logon program, then dependency graph 106 may describe the web application as being dependent on the logon program. An example of dependency graph 106 is shown in FIG. 2 and is discussed subsequently. Software assets, such as code component(s) 104, may have different versions. Version information 108 indicates the various versions of the assets that are in repository 102. For example, if a particular component is revised nine times after it is written, then version information 108 may indicate that there are versions of that component number 1.0 through 1.9. Moreover, to the extent that different versions of a particular asset may be stored in different files, version information 108 may associate particular version numbers with particular files.

Repository 102 may also store test assets, such as test specification(s) 110. Test specification(s) 110 are descriptions of tests that could be performed on particular code component(s) 104. Test specification(s) 110 may specify a test to be performed in an XML, but could also specify the test to be performed using any other format. If an XML format is used, then the specification may conform to some XML schema. Test assets, such as test specification(s) 110, may be represented in dependency graph 106. For example, a test may relate to a particular component, or version of that component, in which case the specification of that test may be indicated in dependency graph 106 as being dependent on the component to which the test relates.

Test specification(s) 110 may be provided by various sources, such as code developers 112 and/or test developers 114. For example, code developers 112 may be people who are writing code component(s) 104. These developers may have detailed knowledge about how the code works, and thus may be able to devise appropriate tests for the code. Moreover, test developers 114 may have expertise in "breaking" software, and thus may be able to devise tests for the software using that expertise. Code developers 112 could create tests for the software at the time the software is being written, thereby allowing some tests to be created in parallel with development of the software. However, code developers 112 could create tests at any time. Similarly, test developers 114 could create tests at any time, although test developers 114 might create tests for a code component after development of that component (e.g., based on an analysis of the component after the component has been written), or otherwise at a time and in a manner that is independent of the development of the component. Code developers 112 and test developers 114 are examples of entities that could create and/or provide tests for a particular code component. These tests could be provided by any entity.

Test server 116 is a machine (or other component) that runs tests on an application. Test server 116 may communicate with repository 102 to receive the code to be tested and/or the specification of the test to be performed. Test server 116 may be remote and/or separate from repository 102. Thus, test server 116 may be able to retrieve software and test assets remotely, and then run a test on the software based on the retrieved test assets.

Test server 116 may use a test engine 118 to perform the test. Test engine 118 may comprise software that operates a piece of software to be tested, based on a particular test script. As previously noted, test specification(s) 110 stored in repository 102 may be in a format that is not specific to a particular text engine, such as an XML format that follows some schema. Different test engines typically employ different scripting languages and/or formats. In order to allow a particular test specification to be used to with test engine 118, test server 116 may employ engine-specific test-specification converter 120. Converter 120 converts a test specification that is in a non-engine-specific format into a script that is applied by a particular engine, such as test engine 118. If the test specification is in an XML form, then the XML schema associated with the specification could be used as part of the process of interpreting the specification and converting that specification into an engine-specific script. Converter 120 may be chosen from a plurality of different converters, where each converter converts the test specification into a script for a different test engine.

FIG. 2 shows an example of dependency graph 106. In the example of FIG. 2, an arrow indicates that the source of the arrow (the nodes where the arrow begins) is dependent on the target. Each of the nodes in FIG. 2 represents an asset that may be stored in a repository, such as repository 102 (shown in FIG. 1). Dependency graph 106 is an example of a record that a repository may maintain of relationships between different assets.

Software 200 is an example of an asset. Software 200 may, for example, be a particular application program, or other type of program. Software 200 may be implemented using various components, and thus dependency graph 106 may show software 200 as being dependent on the components that it uses. Software 200 is shows as being directly dependent on components 202 and 204. Since components 202 and 204 are dependent on other components, software 200 may be understood as having indirect dependencies on other components, such as components 206, 208, 210, and 212.

One understanding of a dependency is that, for a first asset to be dependent on a second asset, means that some action is to be taken if the second asset is newer than the first asset. The nature of the action may depend on the types of assets involved in the relationship. For example, if the assets are two components where one is used in the implementation of the other (e.g., component 202 is dependent on component 206), then the action to be taken if component 206 is newer than component 202 is to recompile or re-link component 206 with component 202. When the dependency relationship is between a test asset and a component, then dependency may mean that the test asset is to be updated (e.g., rewritten, or considered for rewriting) before being used to test a component, since a component that is newer than its test might have new behaviors that are not taken into account by the test.

In the example of FIG. 2, dependency graph 106 is shown as having nodes for test specifications 214 and 216. These test specifications are examples of test assets that may be stored in a repository. Test specification 214 may be a test for component 202, and test specification 216 may be a test for component 206. Each of these test specifications is dependent on its respective component. This dependency may mean that a test specification is considered up to date if it is at least as new as (i.e., does not antedate) the component on which it is dependent, and may be considered for possible rewriting if a new version of the component is created after the test is created. A determination as to whether a test antedates its component may be made by comparing, e.g., the "last-modified" dates associated with the test and the component.

Typically, dependency graphs in software repositories represent code components, such as applications and/or the components of which they are built. However, test assets may be inserted into such a graph, thereby allowing the test assets to make use of the dependency, versioning, etc., that a repository provides.

Figure 3:
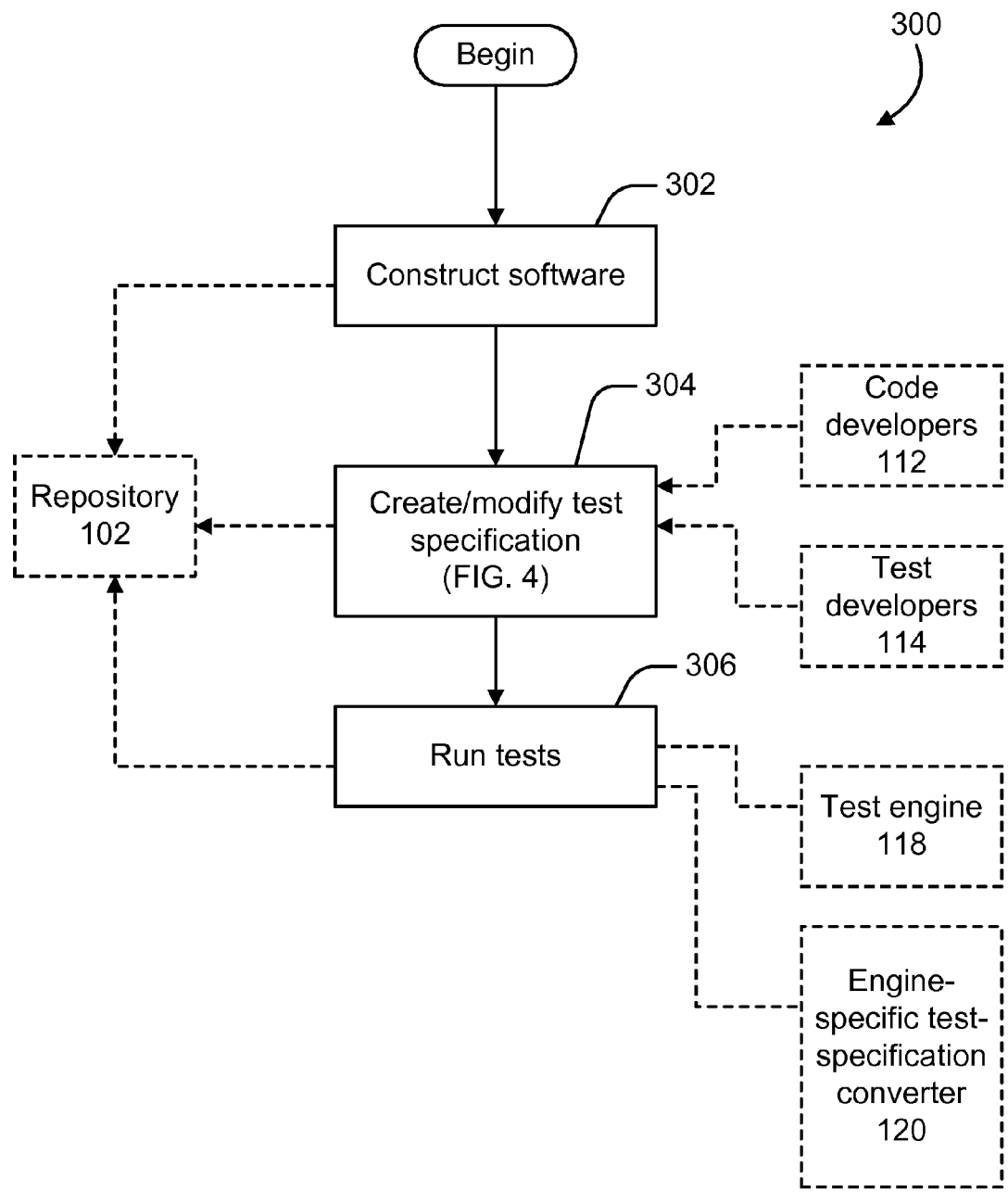
FIG. 3 is a flow diagram of an example process in which software is developed and tested.
Figure 4:
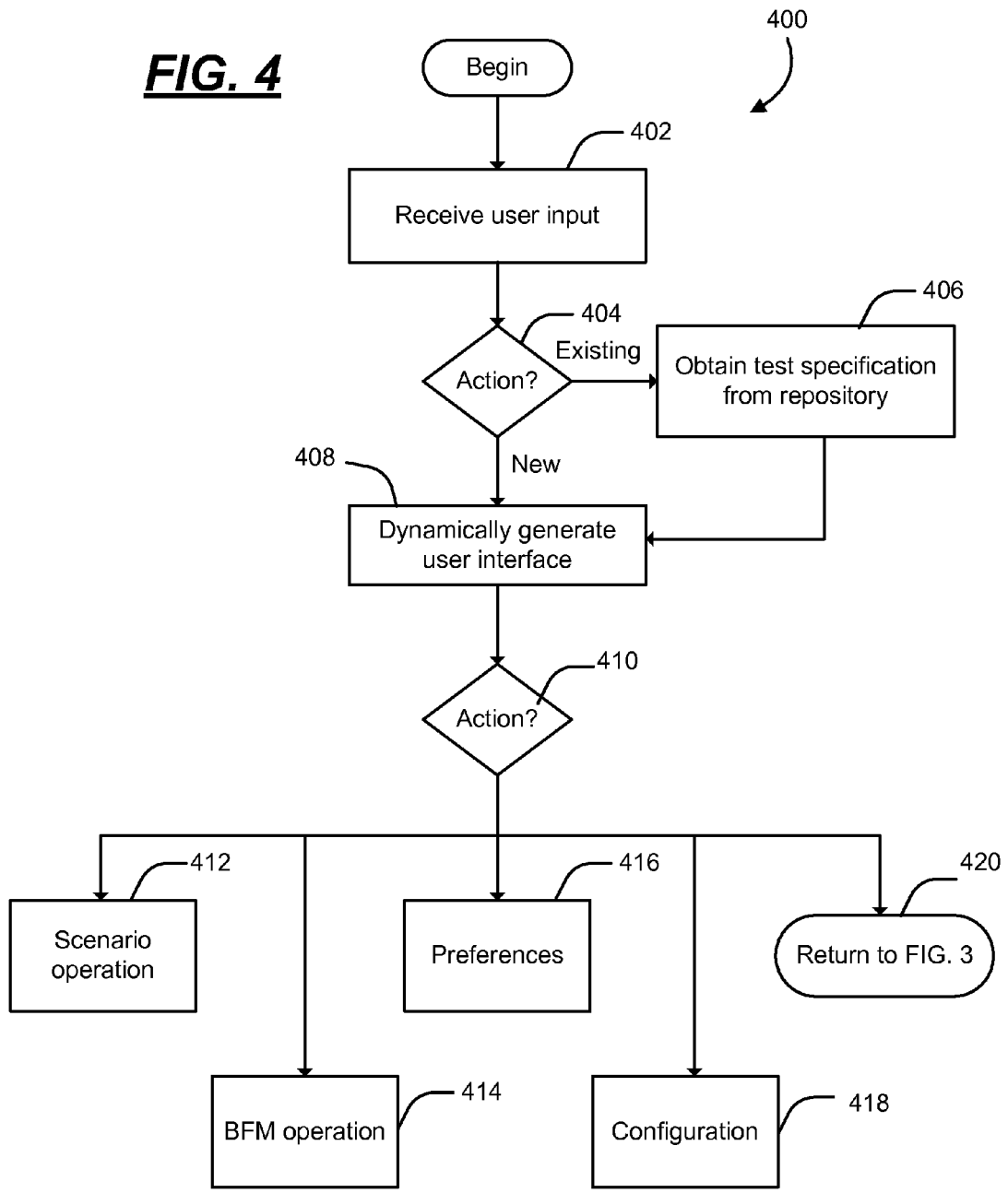
FIG. 4 is a flow diagram of an example process of creating or modifying a test specification.
Figure 5:
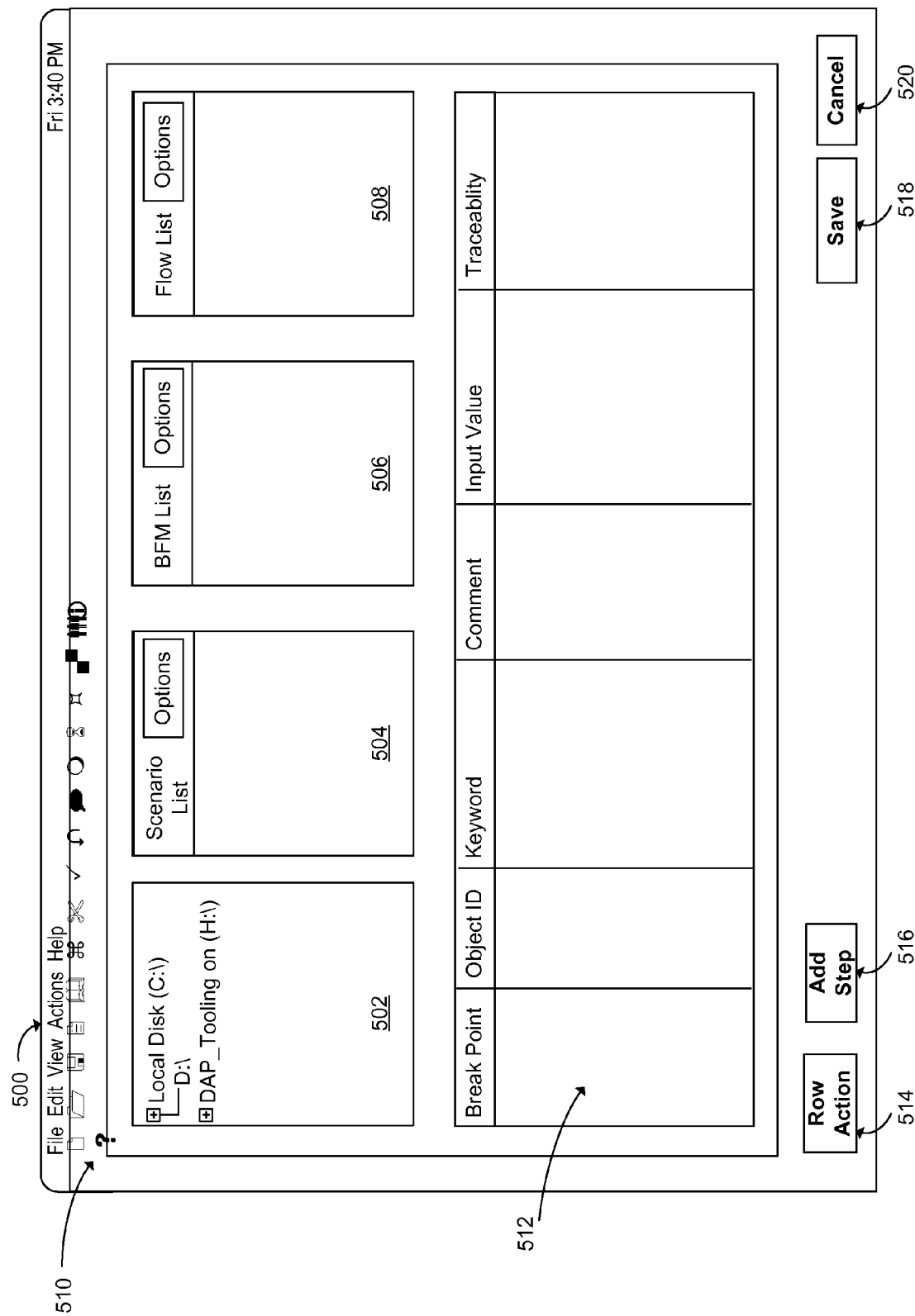
FIGS. 5-13 are illustrations of exemplary user interfaces to create or modify the test specification.

FIG. 3 shows an example process 300 in which software is developed and tested. Before turning to a description of the process, it is noted that the processes in FIGS. 3-4 and interfaces illustrated in FIGS. 5-13 are described, by way of example, with reference to components shown an described herein, although these processes may be carried out in any system and using any components. Additionally, each of the flow diagrams in FIGS. 3-4 shows an example in which stages of a process are carried out in a particular order, as indicated by the lines connecting the blocks, but the various stages shown in these diagrams may be performed in any order, or in any combination or sub-combination.

At 302, the software is constructed—e.g., by coding the software. Creation of software may involve other states that precede the coding, such as analysis and design. These stages may exist, but are not shown in FIG. 3. The code that is written as part of the software construction stage may be stored. Code repository 102 is an example of a place in which the code may be stored.

At 304, a specification of a test may be created. The specification may be created by code developers 112, test developers 114, or by any other entity. The test specification may be stored, for example, in repository 102. In some implementations, the specification of the test may be defined, modified, revised, etc. using the example process 400 shown in FIG. 4 and within the exemplary user interfaces shown in FIGS. 5-13.

At 400, the process begins. At 402, a user input is received. For example, referring to FIG. 5, in user interface 500, a listing of test specification locations may be displayed in an interface box 502. The user interface 500 may be presented within a JAVA Rich Client Platform (RCP). A user action may be received at 404. For example, the user may select among the test specification locations listed in the interface box 502. Additionally or alternatively, the user may choose to create new test specification at 404. If the user selected an existing test specification at 404, then at 406, the selected test specification is obtained from the repository. The test specification may be stored in the repository 102.

At 408, if the user selected an existing test specification location (e.g., DAP_Tooling), the user interface is dynamically populated. The user interface 500 may be dynamically populated with the information retrieved from the repository 102. The retrieved information may include scenarios that populate into a scenario list box 504, business flow modules (BFM) that populate into a BFM module list box 506, and/or flows that populated into a flow list box 508. The specification list may include a test scenario, such as that described with reference to FIG. 14, below. A test scenario may consist of a sequential reference of BFMs. BFMs may represent reusable test specification modules which test specific JAVA Enterprise Application (EAR). BFMs may be deployed onto an application server, such as the test server 116 or a production server. The flows may represent alternate paths within the BFMs. After the data is loaded into the user interface 500, process awaits a user input.

At 410, a user input is received. The user input may be received through one of several input mechanisms. For example, at 412, the user may indicate a scenario operation. This may include making a selection of a scenario within the scenario list box 504 to edit an existing scenario. The selection of an existing scenario may populate related information into the details box 512. The related information may include the actual steps within a test scenario (e.g., launching a browser, opening a URL, editing a box, editing a box, and clicking a button). A row action button 514 may be provided to edit rows pertaining to a scenario within the details box 512. An "Add Step" button 516 may be used to add a step to the scenario steps listed in the details box 512. The user may indicate the changes are to be saved by selecting a save button 518, or may cancel any changes by selecting a cancel button 520.

Figure 6:
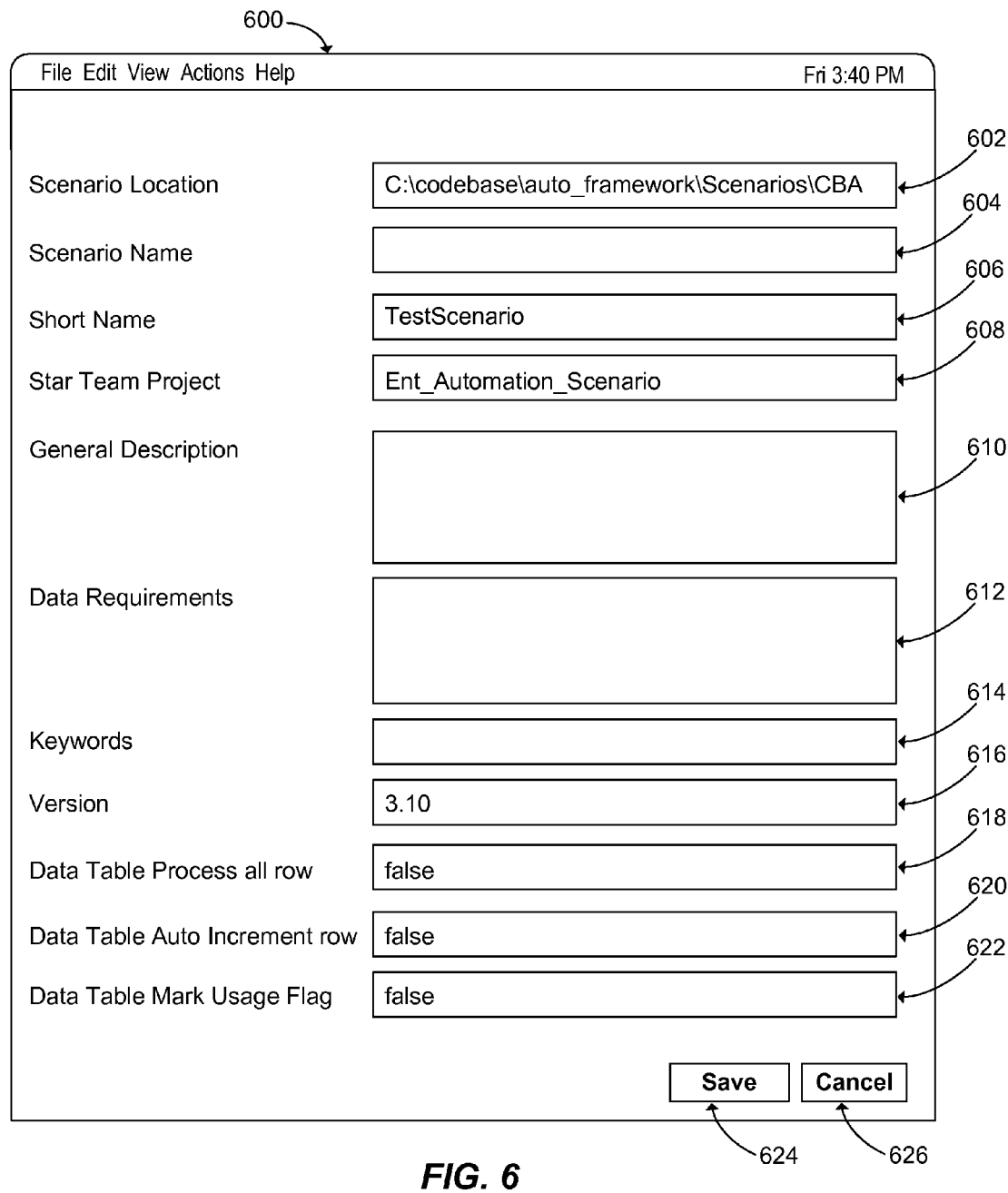

Creating a new scenario at 412 may execute an operation to display a user interface 600 (FIG. 6). The user interface 600 may contain entry fields 602-622, wherein the user populates a location, name, team project, description, requirements, keywords, version, and data table parameters. The user may chose to save or cancel by selected buttons 624 or 626, respectively.

A BFM operation input may be indicated at 414. This may include making a selection of a BFM, within the BFM list box 506, to edit an existing BFM. The selection of an existing BFM may populate related information into the details box 512. A row action button 514 may be provided to edit rows pertaining to a BFM within the details box 512. An "Add Step" button 516 may be used to add a step to the BFM steps listed in the details box 512. The user may indicate the changes are to be saved by selecting a save button 518 or may cancel any changes by selecting a cancel button 520.

Figure 7:
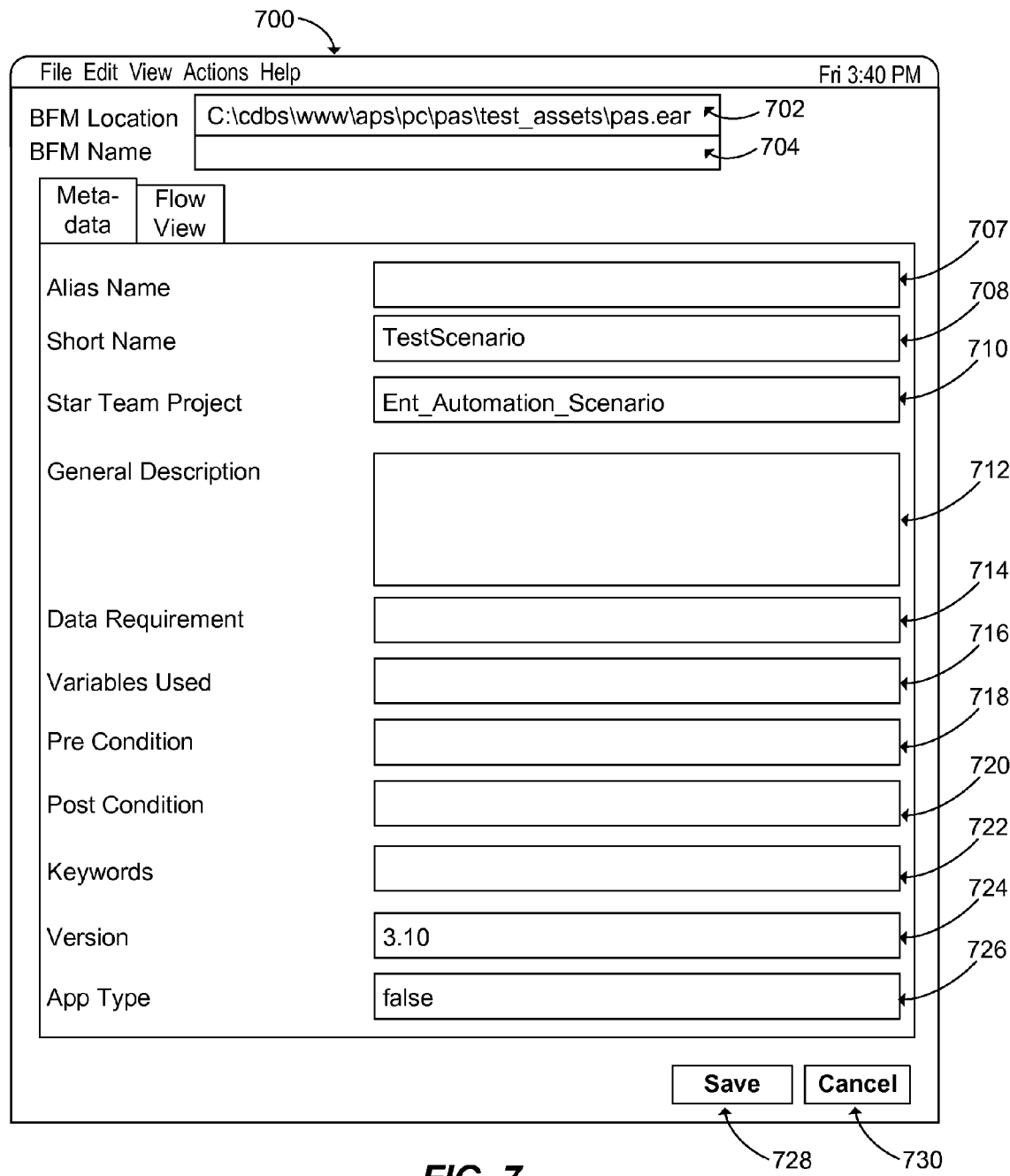
Figure 8:
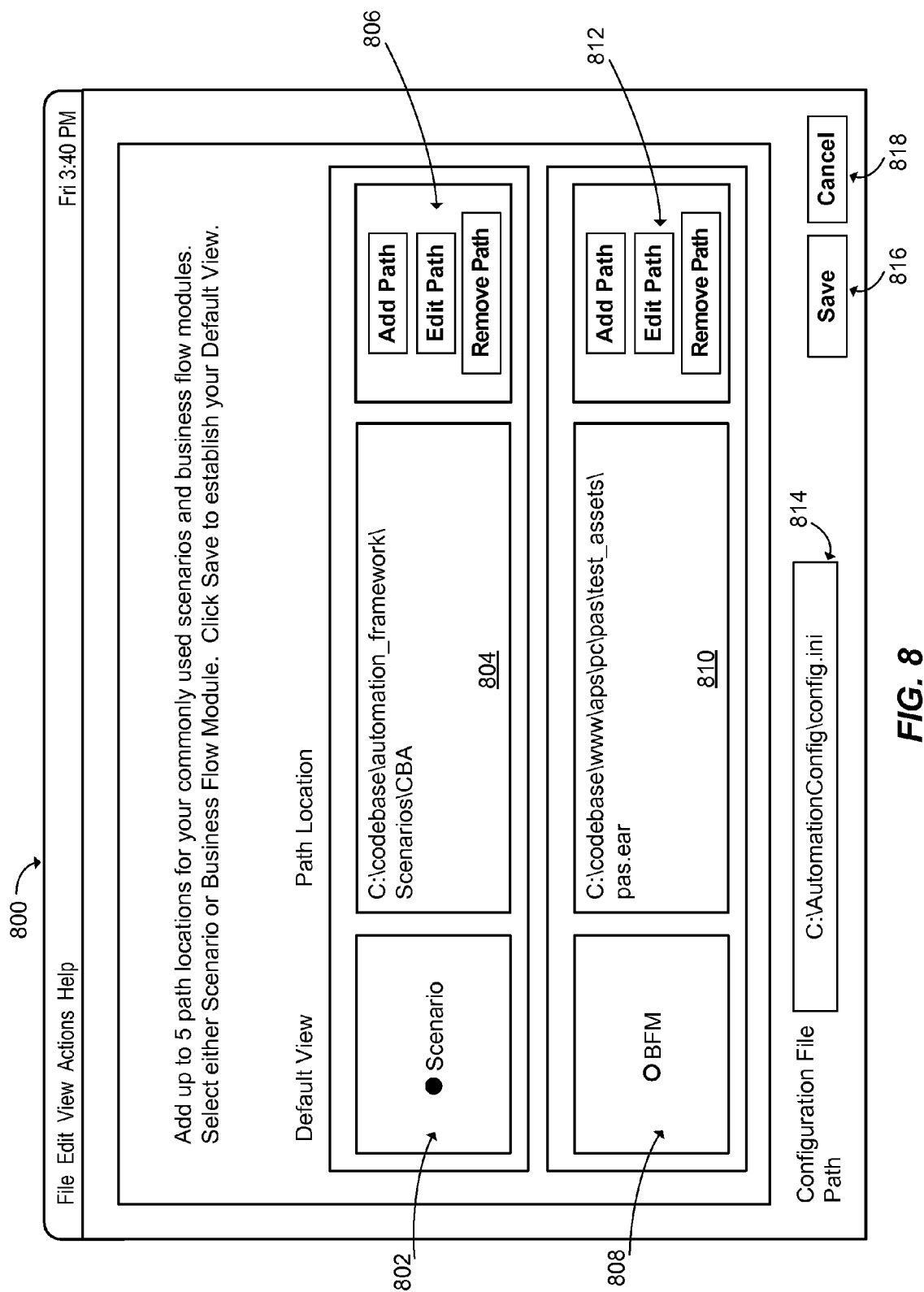

Creating a new BFM at 414 may execute an operation to display a user interface 700 (FIG. 7). The user interface 700 may contain entry fields 702 and 704 to specify information about the BFM location (e.g., a directory on a local or network drive) and BFM name, which may be a name that provides more information or identification of the BFM at the location specified in entry field 702. Entry fields 706-726 may be provided, wherein the user may populate an alias name, a short name, a project name, a general description, data requirements, it was used, preconditions, post-conditions, keywords, version information, and an application type. The user may chose to save or cancel by selected buttons 728 or 730, respectively.

Within the user interface 700, a global BFM may be specified. The global BFM may be reused in one or more test specifications, thus providing an efficient mechanism for users to create and reuse portions of a test specification.

A preferences operation may be indicated at 416. This may include making a selection of a preferences icon within a button bar 510 in the user interface 500 to edit or create user preferences. Selecting the preferences icon may cause a user interface 800 (FIG. 8) to be displayed. The user interface 800 enables a user to specify path locations for commonly used scenarios and BFMs. A scenario selection radio button 802 and a BFM selection radio button 808 are provided to specify which default view the user prefers. As shown in the example user interface 800, user has selected the "Scenario" default view. Within path location area 804, path locations to the user preferred scenarios may be specified. Action buttons 806 enable a user to add, edit or remove a path within the path location area 804. Similarly, with regard to BFMs, a path location area 810 is provided to specify paths to the user-preferred BFM code. Action buttons 812 are provided to add, edit or remove a path from a path location area 810. A configuration file may be specified in entry area 814 to save the user preferences. In some implementations, the configuration settings may be stored in a database to enable greater accessibility to the configuration settings.

Figure 9:
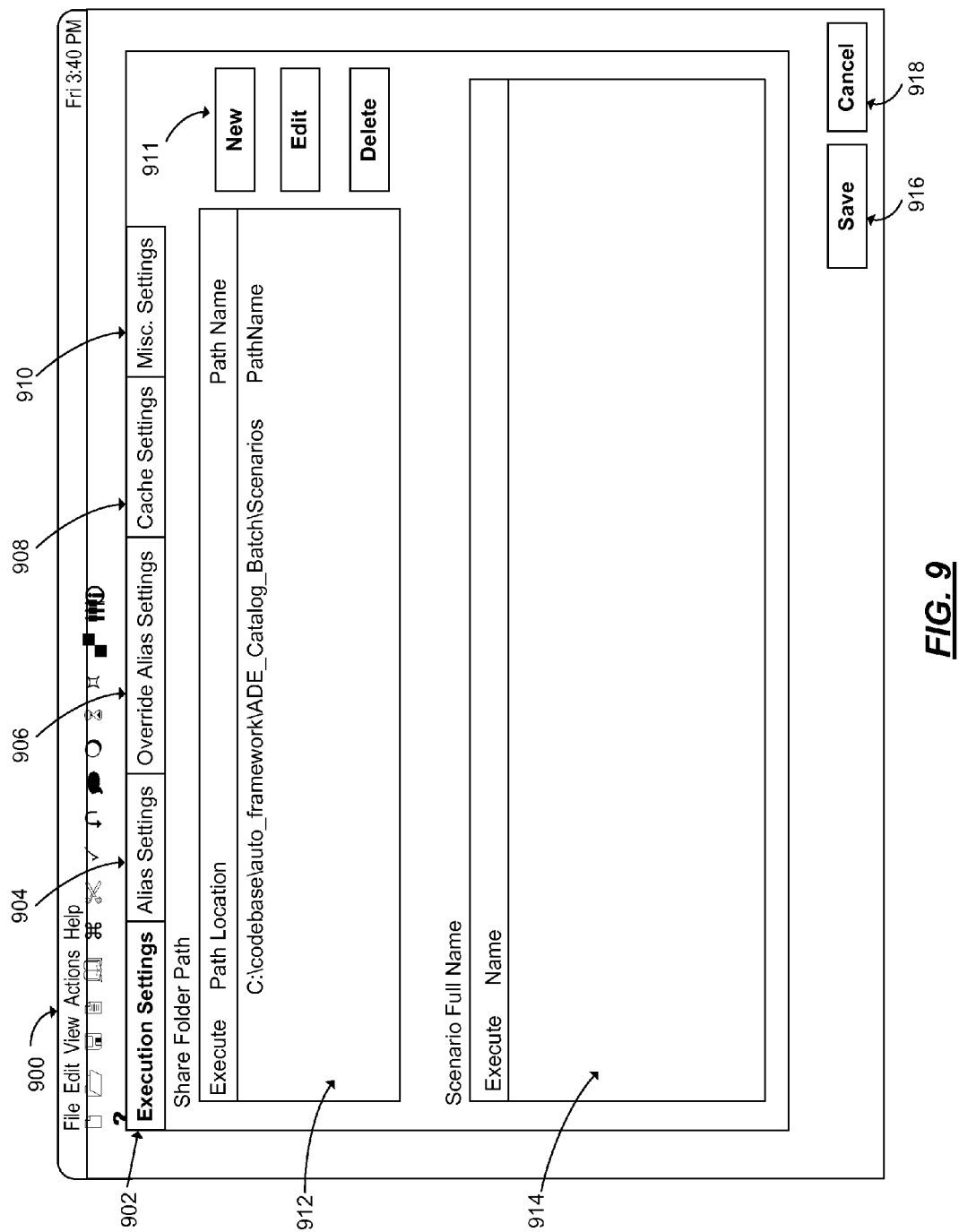

A configuration operation may be indicated at 418. This may include making a selection of a configuration icon within the button bar 510 in the user interface 500 to edit or create configuration settings. Selecting the configuration icon may cause a user interface 900 (FIGS. 9-13) to be displayed. The user interface 900 may be used to configure aspects of the testing scenarios, other details associated with the codebase in the repository 102, or the testing server 116. As shown in FIG. 9, the user interface 900 includes an execution settings tab 902, an alias settings tab 904, and override alias settings tab 906, a cache settings tab 980, and a miscellaneous settings tab 910.

FIG. 9 shows the user interface 900 when the execution settings tab 902 is selected. A share folder path display area 912 is provided to display the path to scenarios and whether the path should be executed. For example, if a path is to be executed, a radio button shown in the share folder path display area 912 may be shown as a selected. Action buttons 911 enable the user to create a new path location, edit an existing application, or delete an existing application from the share folder paths.

A scenario full name display area 914 may be provided to display a more meaningful name for the scenario shown in the share folder path display area 912. For example, information used to populate the scenario full name display area 914 may be retrieved from user-entered information in entry field 604 (FIG. 6) indicating a scenario name that is associated with the scenario location identified by the path in the share folder path display area 912.

A user may make and indication to save or cancel changes entered into the user interface 900 by selecting a save button 916 or a cancel button 918, respectively.

Figure 10:
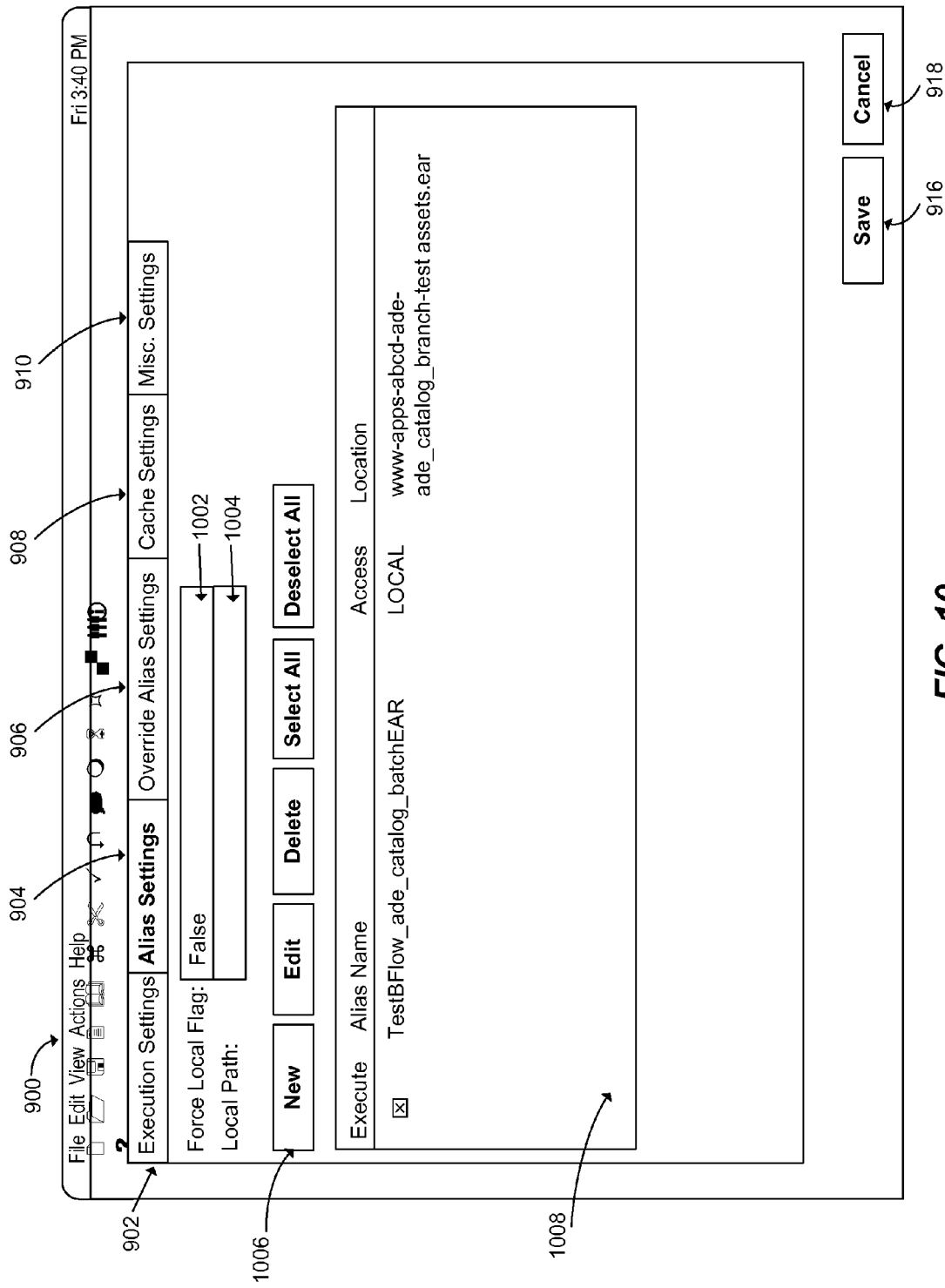

FIG. 10 shows the user interface 900 and when the alias settings tab 904 is selected. The alias settings enable a user to specify an alias name and associate it with a location. In particular, a local version or checked-out version of a scenario or part of a scenario maybe specified in the display area 1008 as an alias for another version of the scenario or part of the scenario. A checkbox is provided to indicate whether the aliased version should be executed or not. As shown in the display area 1008, the local alias will be executed for the code at the specified location. Action buttons 1006 enable user to specify a new alias, edit an existing alias, and delete an existing alias. In addition, user may select all or deselect all to perform the editing and deleting operations.

Figure 11:
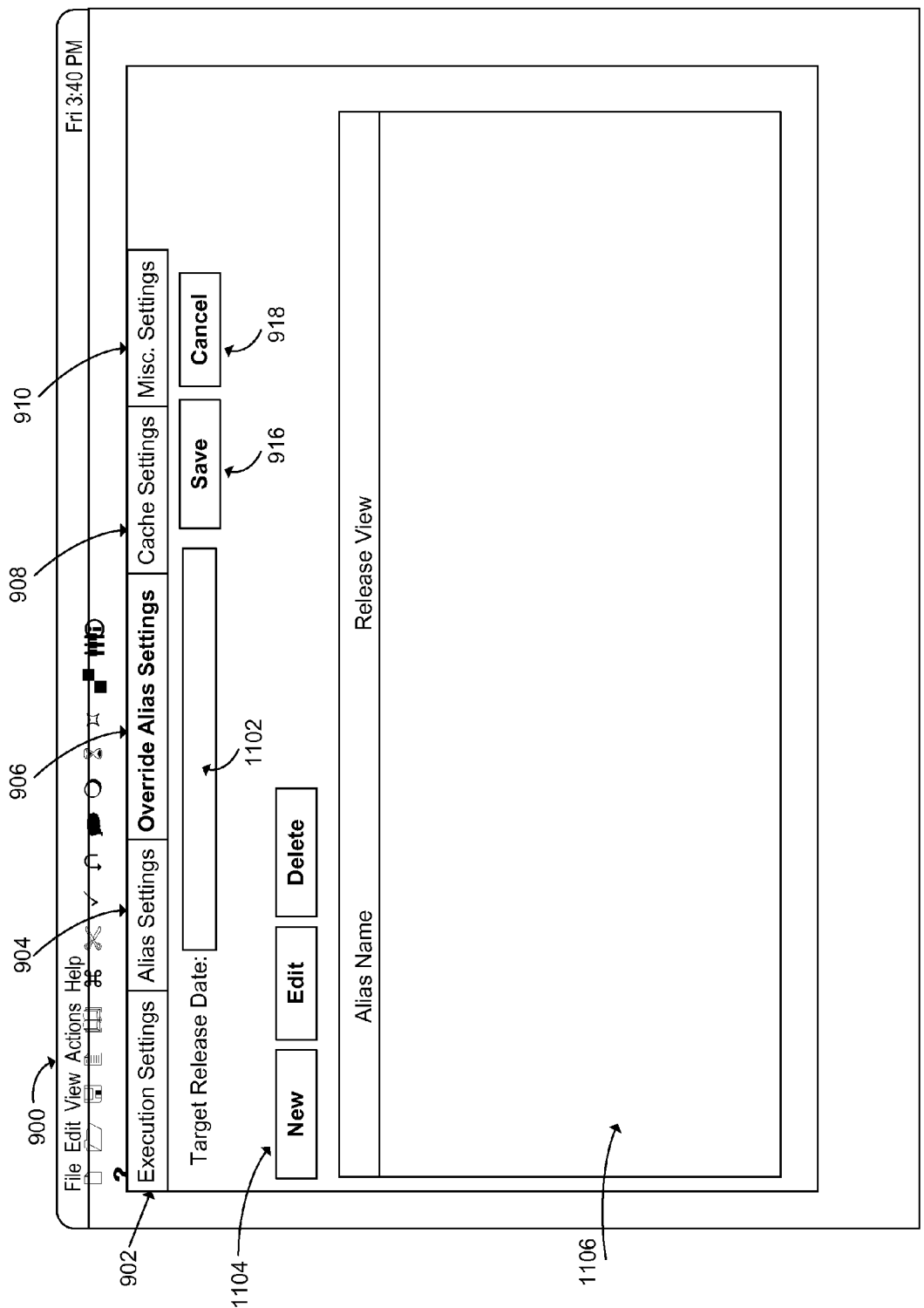

FIG. 11 shows the user interface 900 and when the override alias settings tab 906 is selected. The override alias settings enable a user to specify when an alias name is temporally valid. For example, a scenario may test a website, as it exists in its present form. However, there may be planned changes to the code underlying the website at a date in the future, which may need to be tested. For example, a customer login screen may have a planned upgrade to enhance security. A test scenario that includes logging into the website may wish to account for that planned upgrade. Override alias settings provides an entry area 1102 in which a user may specify a target release date, e.g. the date of the planned upgrade. In the entry area 106, using the action buttons 1104, a user may specify aliases that will be overridden at some date, each having a release effective date specified within the release view column.

Figure 12:
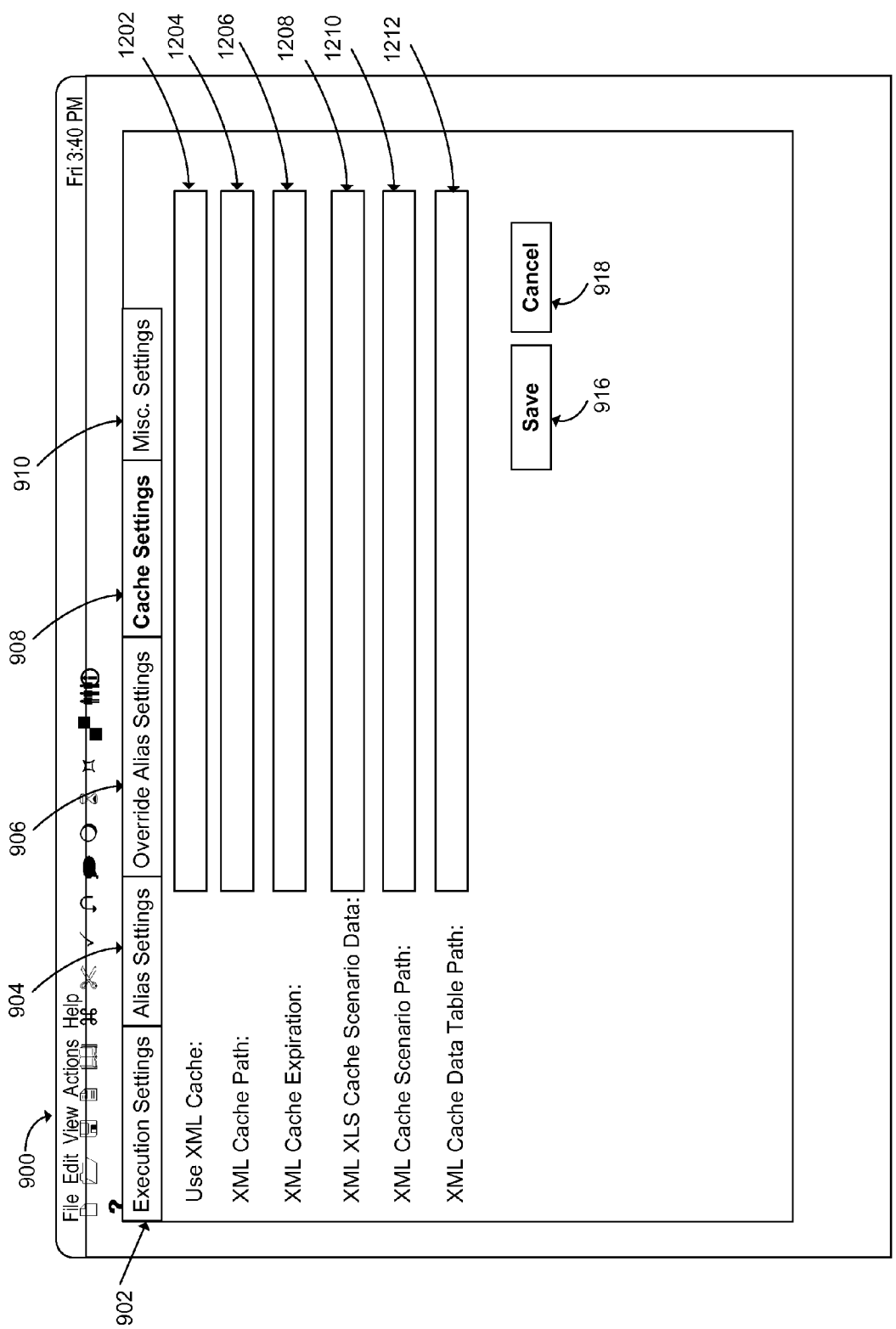

FIG. 12 shows the user interface 900 and when the cache settings tab 908 is selected. A user may specify parameters in fields 1202-1212 associated with an XML cache. For example, the user can specify whether to use the XML cash, an XML cash path, and XML cache expiration (e.g., in seconds), if XML XLS cache scenario data exists, an XML cache scenario path, and a XML cache data table path.

Figure 13:
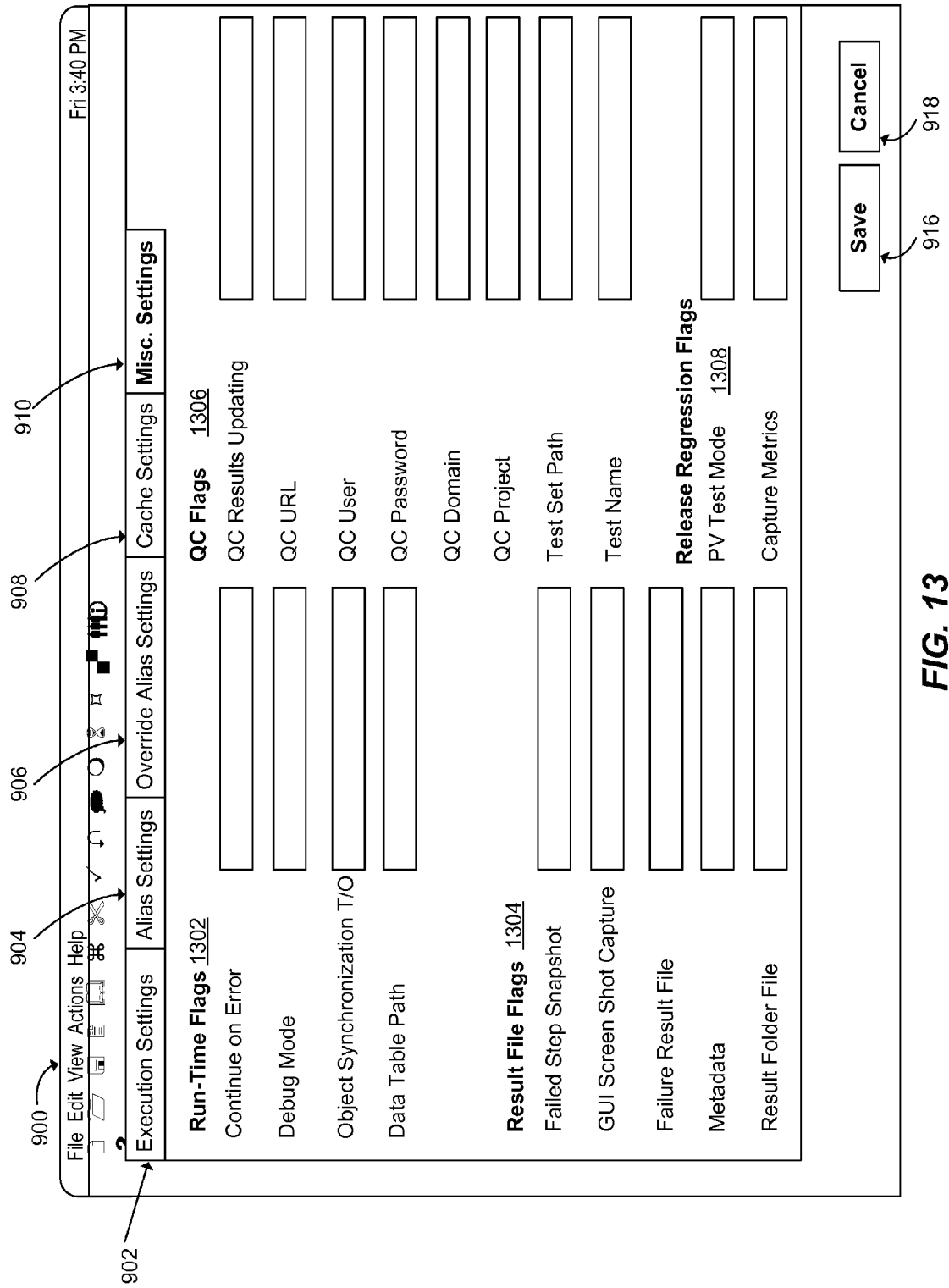

FIG. 13 shows the user interface 900 and when the miscellaneous settings tab 910 is selected. The miscellaneous settings define settings associated with runtime flags 1302, result file flags 1304, QC flags 1306, and recent regression flags 1308. These settings define certain runtime operations associated with testing of an application on the test server 116.

Referring again to FIG. 4, at 420, an indication is received to run the test specification. As such, the flow returns to FIG. 3, as the test specification is now created (in accordance with the flow diagram of FIG. 4 and the user interfaces of FIGS. 5-13). At 306, tests on the software are run, using the test specification. The test specification may be retrieved, for example, from repository 102. In some implementations the test specification may include locally checked-out portions, as noted above. As previously noted, the test specification may be in a non-engine-specific format, such as XML that follows some schema. Running the test may involve using an engine-specific test-specification converter 120, to convert specification into a script in a language usable by test engine 118. The script may then be used to interact with the software that is being tested. This interaction may be driven by test engine 118.

Figure 14:
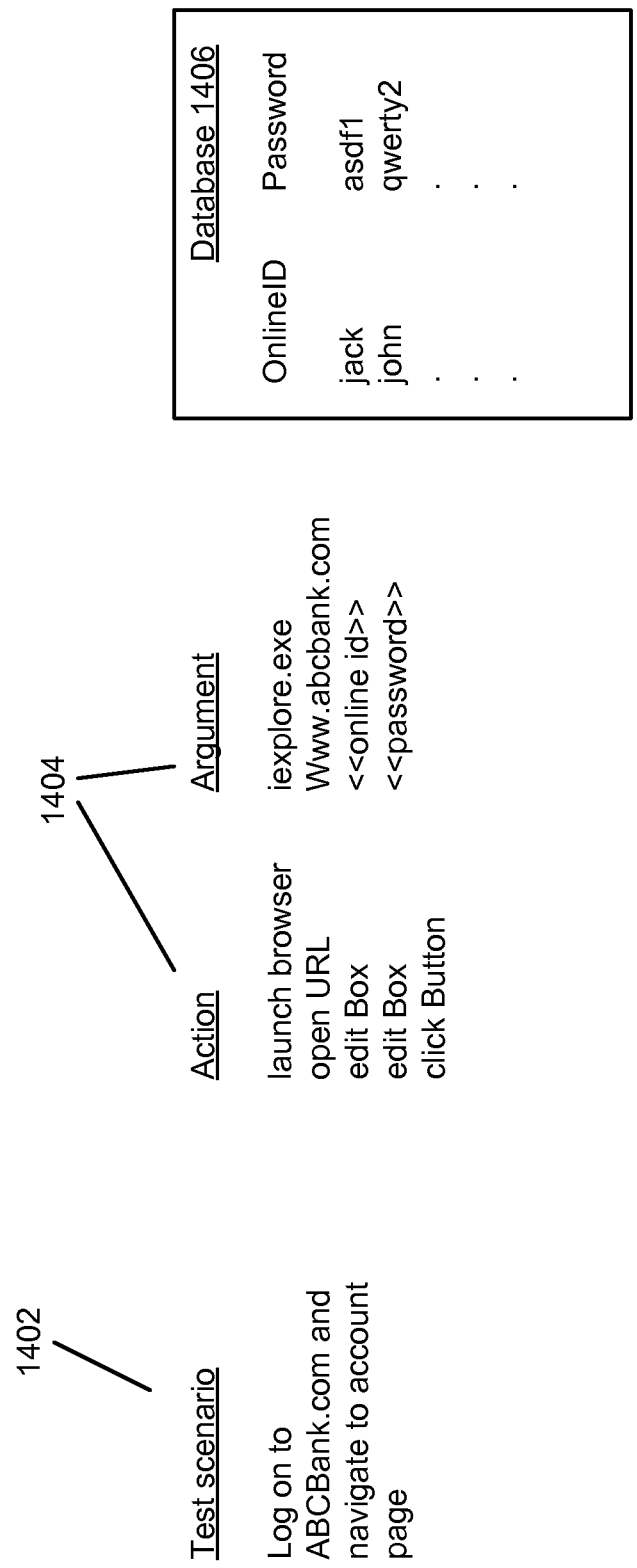
FIG. 14 is a block diagram of example actions that could be specified in a test scenario.

FIG. 14 shows an example in which a web application is being tested, although any type of software could be tested. A test scenario 1402 involves logging onto the web site of ABCBank.com, and navigating to the "account" page of that web site. Such steps may be presented and edited in the user interface 500 in the scenario list box 504. Thus, the test to be performed on the web application is to determine whether, given the appropriate input, the web application will allow the user to navigate to the account page.

Reference 1404 shows various example actions that could be used to interact with the web application in order to carry out test scenario 1402. Some or all of the actions could have arguments. Such example actions and arguments may be presented and edited in the user interface 500 in the details box 512. For example, in order to perform the test scenario, one action may be to launch a browser, where the argument is the name of a specific browser (e.g., iexplore.exe). Another action could be to open a specific Uniform Resource Locator (URL), which, in this case (as specified by the argument) is abcbank.com. This might take the user to a logon page for abcbank.com. Other actions could be to enter an identifier and password into appropriate boxes. The values to be entered could be specified in the actions as variables (e.g., <<onlineid>> and <<password>>), and the actual values (or pairs of values) could be obtained from database 1406, which lists replacement candidates for the variables (e.g., valid pairs of values for the onlineid and password variables). The values in database 1406 could be substituted for the variables and entered in the boxes during a testing process. After the appropriate information is entered into the boxes, the next action to be performed could be to click the submit button. Clicking submit on the logon page may take the user to the account page, in which case the test scenario would be completed. Performing these actions might result in the expected behavior, or not. Either way, the result of the action could be reported.

At 1404, various abstract actions that could be performed are shown. These actions could be part of a test specification. (FIG. 14 shows the actions being specified in the form of a list, although, as previously noted, a specification could be in an XML format, or in any other format.)

Figure 15:
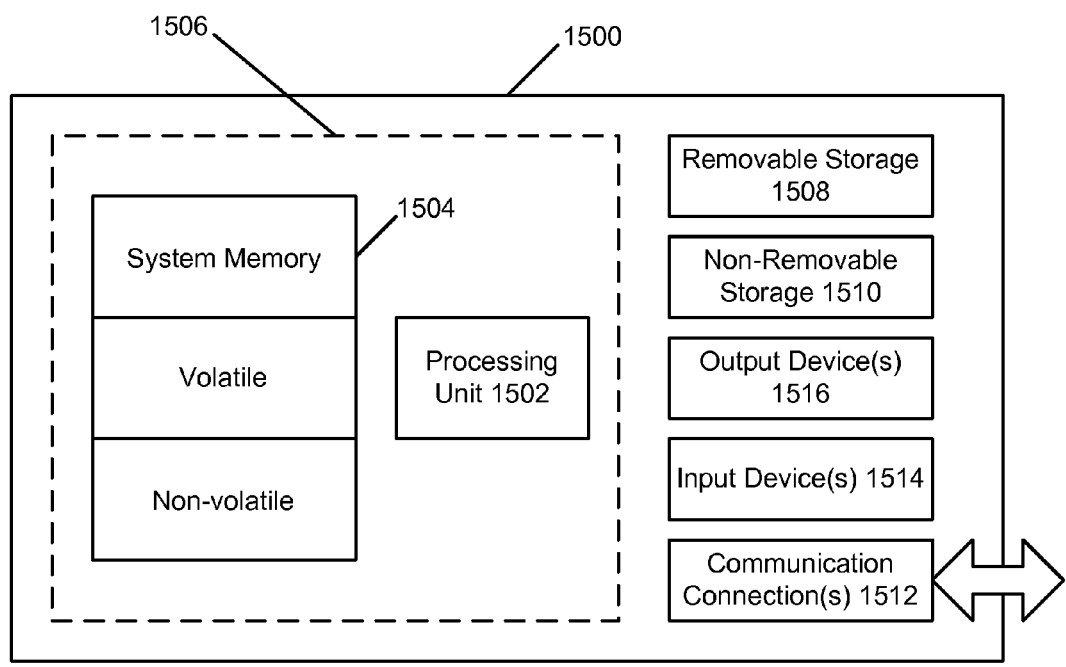
FIG. 15 is a block diagram of an example computing environment that may be used in connection with implementations of the subject matter described herein.

The subject matter described herein may be implemented through the use of a computer system, or other type of device that has some computing mechanism(s). FIG. 15 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 15, an example system for implementing aspects described herein includes a computing device, such as computing device 1500. In its most basic configuration, computing device 1500 typically includes at least one processing unit 1502 and memory 1504. Depending on the exact configuration and type of computing device, memory 1504 may be volatile (such as random access memory (RAM)), non-volatile (such as read-only memory (ROM), flash memory, etc.), or some combination of the two. This most basic configuration is illustrated in FIG. 15 by dashed line 1506.

Computing device 1500 may have additional features/functionality. For example, computing device 1500 may include additional storage (removable and/or non-removable) including, but not limited to, magnetic or optical disks or tape. Such additional storage is illustrated in FIG. 15 by removable storage 1508 and non-removable storage 1510.

Computing device 1500 typically includes a variety of computer readable media. Computer readable media can be any available media that can be accessed by computing device 1500 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 1504, removable storage 1508, and non-removable storage 1510 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of computing device 1500.

Computing device 1500 may also contain communications connection(s) 1512 that allow the device to communicate with other devices. Communications connection(s) 1512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 1500 may also have input device(s) 1514 such as keyboard, mouse, pen, voice input device, touch input device, etc. Output device(s) 1516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A system for testing software, comprising:
   a processing unit;
   executable instructions that, when executed by the processing unit, cause the processing unit to:
   receive, via a user interface, an indication of a test specification, the test specification defining a dependency between at least one test scenario and at least one code component of an application;
   retrieve, from a repository, data associated with the test specification to dynamically update the user interface;
   present, within the user interface, a view of the test scenario containing steps and actions performed in accordance with the test specification;
   build a markup language test script based on the data that is used to dynamically update the user interface receive, within the user interface, an indication of an action to modify a portion of the code component associated with the test specification;
   check out the portion of the code associated with the test specification to be modified;
   execute testing of the software utilizing the portion of the code as checked-out code; present alias options in the user interface;
   execute testing of the software in accordance with the alias options to utilize the checked-out code; and
   wherein the set of executable instructions further comprise instructions executed to dynamically update the repository with changes to the code.

2. The system of claim 1, wherein the set of executable instructions further comprise instructions executed to:
   present override options in the user interface, the override options specifying a date parameter used by the test specification.

3. The system of claim 1, wherein the repository is updated without repackaging the application.

4. The system of claim 1, wherein test specification is in an eXtensible Markup Language (XML) format, and wherein the system further comprises at least one subsystem that uses the XML format to dynamically update a JAVA Rich Client Platform (RCP) user interface.

5. A computer-implemented method for testing software, the method comprising: receiving, in a user interface coupled to a computing device, an indication of a test specification, the test specification defining a dependency between at least one test scenario and at least one code component of an application;
 retrieving, from a repository coupled to the computing device, data associated with the test specification to dynamically update the user interface;
 presenting, within the user interface, a view of the test scenario containing steps and actions performed in accordance with the test specification;
 building a markup language test script based on the data that is used to dynamically update the user interface;
 receiving within the user interface, an indication of an action to modify a portion of the code component associated the test specification;
 checking-out, via the computing device, the portion of the code associated with the test specification to be modified;
 executing, via the computing device, testing of the software utilizing the portion of the code as checked-out code;
 presenting alias options in the user interface;
 executing, via the computing device testing of the software in accordance with the alias options to utilize the checked-out code; and
 dynamically updating, via the computing device, the repository with changes to the code.

6. The method of claim 5, further comprising:
 presenting, via the computing device, override options in the user interface, the override options specifying a date parameter used by the test specification.

7. The method of claim 5, wherein the repository is updated, via the computing device, without repackaging the application.

8. The method of claim 5, wherein the test specification is in an eXtensible Markup Language (XML) format, and wherein the method further comprises using the XML format to dynamically update, via the computing device, a JAVA Rich Client Platform (RCP) user interface.

9. A non-transitory computer-readable medium comprising computer-readable instructions for testing software, the computer-readable instructions when executed performing a method, comprising:
 receiving, in a user interface, an indication of a test specification, the test specification defining a dependency between at least one test scenario and at least one code component of an application;
 retrieving, from a repository, data associated with the test specification to dynamically update the user interface;
 presenting, within the user interface, a view of the test scenario containing steps and actions performed in accordance with the test specification;
 building a markup language test script based on the data that is used to dynamically update the user interface
 receiving, within the user interface, an indication of an action to modify a portion of the code component associated the test specification;
  checking-out the portion of the code associated with the test specification to be modified; executing testing of the software utilizing the portion of the code as checked-out code;
  presenting alias options in the user interface;
  executing testing of the software in accordance with the alias options to utilize the checked-out code; and
  instructions for dynamically updating the repository with changes to the code.

10. The non-transitory computer-readable medium of claim 9, further comprising instructions for:
 presenting override options in the user interface, the override options specifying a date parameter used by the test specification.

11. The non-transitory computer-readable medium of claim 9, wherein the repository is updated without repackaging the application.

12. The non-transitory computer-readable medium of claim 9, wherein test specification is in an eXtensible Markup Language (XML) format, and further comprising instructions for using the XML format to dynamically update a JAVA Rich Client Platform (RCP) user interface.

* * * * *